(12) United States Patent
Okolo

(10) Patent No.: US 8,478,251 B1
(45) Date of Patent: Jul. 2, 2013

(54) EVENT RESPONSE APPARATUS AND METHOD

(76) Inventor: Uzochukwu Okolo, Pottstown, PA (US)

( * ) Notice: Subject to any disclaimer, the term of this patent is extended or adjusted under 35 U.S.C. 154(b) by 0 days.

(21) Appl. No.: 13/357,590

(22) Filed: Jan. 24, 2012

(51) Int. Cl.
*H04M 3/42* (2006.01)

(52) U.S. Cl.
USPC .......................................... 455/414.1; 705/40

(58) Field of Classification Search
USPC .. 455/414.1–414.3, 405–408; 705/26.1–27.2, 705/39–45
See application file for complete search history.

(56) References Cited

U.S. PATENT DOCUMENTS

| | | | | |
|---|---|---|---|---|
| 8,032,181 B2 * | 10/2011 | Hauck et al. | ................ | 455/558 |
| 8,255,281 B2 * | 8/2012 | Benson et al. | ............... | 705/26.1 |
| 2001/0027422 A1 | 10/2001 | Brandrud | | |
| 2002/0002504 A1 | 1/2002 | Engel et al. | | |
| 2002/0010515 A1 | 1/2002 | Fukuoka et al. | | |
| 2004/0143546 A1 * | 7/2004 | Wood et al. | .................... | 705/40 |
| 2006/0036502 A1 | 2/2006 | Farrell | | |
| 2006/0136334 A1 | 6/2006 | Atkinson et al. | | |
| 2006/0237532 A1 | 10/2006 | Scott-Leikach et al. | | |
| 2007/0192206 A1 | 8/2007 | Manesh et al. | | |
| 2008/0052254 A1 | 2/2008 | Al Amri | | |
| 2009/0166375 A1 | 7/2009 | Butler et al. | | |
| 2011/0153453 A1 | 6/2011 | Ghafoor et al. | | |

* cited by examiner

*Primary Examiner* — Kashif Siddiqui
(74) *Attorney, Agent, or Firm* — Louis Ventre, Jr.

(57) ABSTRACT

A specially programmed computer and method supported by the use of individual mobile communication devices manages, organizes and automates responses to events. The responses are taken by third parties that address activities related to the events. The computer: receives ownership data concerning a new mobile phone account; receives a request from the user to participate in the automated system with respect to any event response automated by the computer; enables the user to activate the system by sending an action relating to any such event; creates a template for the user of the mobile phone account; creates an activity block that holds a matrix of information associated with each such event; and automatically implements responding action as dictated by the event responder.

20 Claims, 13 Drawing Sheets

ACTIVITY (In-store shopping) — 830

| Actionable Event | Description | Preceding Event | Duration of Event | Cost/Impact | Freq. of Occur. | Prob. of Recurrence | Risk Factor (1-10) | Action/Resolution | Response Target |
|---|---|---|---|---|---|---|---|---|---|
| ISA-010RT | Flagged item dropped from shopping cart | Comparison shopping | 2 mins. | Loss of business | High | High (0.8) | High (9.0) | Notify Store Associate | Customer |
| ISA-013RT | Customer seeks assistance | Review of product features etc. | 15 mins. | Customer satisfaction | Low | Medium (0.5) | Medium (5.0) | Notify Store Associate | Customer |
| ISA-016RT | Customer invites social network | Req'st for store associate assist. | 15 mins. | Customer satisfaction | Medium | Medium (0.6) | Medium (5.0) | Enable Event | Customer |
| ISA-019RT | Item vulnerable to theft | Added to shopping cart | 2 mins. | Shrinkage | Medium | High (0.8) | High (9.0) | Verify Inventory | Retailer |
| ISA-022RT | Trans. funds make purchases, track ROI | Designate payout location | 3 mins. | Post transfer analysis | High | High (0.9) | Low (1.0) | Enable Event | Sender/Receiver |

FIG. 9

ACTIVITY (Critical shopping requirement) — 830

| Action-able Event | Description | Preceding Event | Duration of Event | Cost/Impact | Freq. of Occur. | Prob. of Recur-ence | Risk Factor (1-10) | Action/Resolution | Response Target |
|---|---|---|---|---|---|---|---|---|---|
| CSRA-030SA | Impending natural event | Credible Forecast Obtained | Future Date | Highly disruptive | Seasonal | High (0.8) | High (9.0) | Gen. crit. item shop'g list | Area resident |
| CSRA-035SA | Current natural event | Events reporting | 0-X hrs | Highly disruptive | Seasonal | High (0.8) | High (9.0) | Monitor resp. to shop'g list | Area resident |

FIG.10

ACTIVITY (Product recall) — 830

| Action-able Event | Description | Preceding Event | Duration of Event | Cost/Impact | Freq. of Occur. | Prob. of Recur-ence | Risk Factor (1-10) | Action/Resolution | Response Target |
|---|---|---|---|---|---|---|---|---|---|
| PRA-040-FPD | Food product recall | Customer com-plaints | 4-6 days | Credibility, earnings erosion etc. | Low | Low-Medium (0.2-0.5) | High (9.0) | Proceed with recall | Customer/Retailer |
| PRA-045-MPD | Mechanical product recall | Internal investi-gation | 2 months | Credibility, earnings erosion etc. | Medium | Medium-High (0.5-0.9) | High (9.0) | Proceed with recall | Customer/Retailer |

FIG.11

EVENT RESPONSE APPARATUS AND METHOD

TECHNICAL FIELD

In the field of data processing, a financial, business practice, and event management system and corresponding method for performing data processing operations, in which there is a significant change in the data and responsive operations, wherein the apparatus and method are uniquely designed for and utilized in the practice, administration, and management of an enterprise.

BACKGROUND ART

The mobile phone has clearly evolved from its role in the 1970's and 1980's when it was used strictly for communication; to its current standing as a vehicle for entertainment, information, social networking, mini-computing and business transactions.

Tablet computers are just beginning to be adopted for a wide variety of computing and entertainment applications. Combining the rise of the tablet computer with the growth of smart phone usage creates immense potential in facilitating the growth of mobile commerce.

The use of mobile phones for conducting business transactions is growing as new technologies have been developed to support these activities. This trend is also emerging in traditional in-store environments where consumers may use their mobile phones to make payments for goods purchased by waving the phone close to a device that is powered by near field communication technology (NFC).

The consumer may simply provide their name to the store clerk who activates the mobile payment option for payment using a mobile phone or in other instances, merchant may swipe a credit card provided by customer using a hardware attached to the mobile phone that is capable of reading magnetic stripes contained on credit card.

SUMMARY OF INVENTION

An apparatus and method supporting use of individual mobile communication devices to manage, organize and automate responses to events by third parties responsible for addressing activities related to the events. The apparatus is a specially programmed computer that controls an automated system programmed to implement the method steps upon activation, for example by the user or by an event responder.

The computer receives ownership data concerning a new mobile phone account provided to the user by a third party, who is typically a mobile phone carrier. The data may come from the user, the mobile phone carrier or another person. The computer then receives a request from the user to participate in the automated system with respect to any event response automated by the computer. Once the computer receives that request, the computer then enables the user to activate the system at any time by sending to the computer via the mobile communication device an action relating to any such event.

After the computer receives notice of the new mobile phone account, the computer creates a template for the user of the mobile phone account. A separate template is associated with each event having an automated response. The template is subdivided into an activity block and an activity cell.

The activity block holds a matrix of information associated with each such event. The matrix of information identifies or describes the event; identifies additional user input required by an event responder upon the occurrence of the event; contains an explanation of a responding action expected of the event responder upon the occurrence of the event; and includes the identity of a person with whom the responding action is to be made (which may or may not be the user).

The activity cell includes software program code that automatically implements responding action as dictated by the event responder.

Once the template is in place, the computer then receives notice of the occurrence of the event either from the user or a third party. Upon such notice, the computer automatically implements on the responding action with the person in response to the occurrence of the event. Such implementation may include providing guidance, tracking and reporting on the event.

Events for which a response is automated are as diverse as human experience in which services are provided to assist the user. For example, an event might be an earth quake prediction and the event responder might be a government agency desiring to send alert messages and guidance to users. Another more frequent event might be a consumer scanning a bar code to find information or request assistance on a product.

Technical Problem

There is no organizing system to automate responses to a diverse set of events. An organizing system is needed to make it easy to automate a diverse set of responses to events. Organized interactions are not yet supported by current technology, but such automation can significantly aid the consumer, the retailer and government agencies to name just a few.

The use of mobile devices for making payment at parking meters or gas stations is still evolving. In the case of parking meters, credit cards and cash payment methods are prevalent, where the mobile payment option exists, they do not allow the driver to prepay in advance for parking space or dispute a ticket electronically with systematic tracking capabilities.

In the case of gas stations, credit cards and cash payment methods are mostly used; therefore a gas station customer may not be able to automatically review promotional offerings on the favorite items they purchase at the store on their mobile device after wireless signals are received on the mobile phone or tablet computer from another mobile device assembled on a gas dispenser.

In the area of paperless money transfer, prior art systems do not enable the sender/receiver to designate a payout location based on expected business transactions to be undertaken with the money transfer proceeds and the associated benefits for using same at the location. Also, any future requirements to track and analyze events subsequent to the money transfer cannot be accomplished.

When two parties to a joint venture agreement transfer funds for use in a business activity and the receiving party is required to spend some or all the proceeds at the payout location, the proposed system tracks the spending for the goods/services and provides reports showing such statistics as: re-sale of the procured item(s) and associated profitability level or the consumption level of such procured items in the course of a normal business operation.

The inability of prior art systems to organize the response to complex needs presents a significant deficiency that has a solution.

For example, prior art systems prevent retailers from offering additional savings to customers based on their employment or income circumstances, because there is a lack of integration with an income verification services provider.

In recessionary times, retailers tend to face sluggish sales either because some consumers are out of work or have elected to reduce spending. To boost sales, traditional retailers initiate various discount programs that benefit all customers, regardless of their socio-economic circumstances. While some of these sales promotions do help in reducing inventory, the fact that they fail to address the central issue of knowing the ability of customers to pay leaves a major gap to be filled.

Prior art systems do not enable the retailer to automatically engage a customer in the store who may be inclined not to buy a product based on the result of a comparison shopping or notify a customer when there is product recall.

Prior art systems do not provide automatic early warning and regular updates in support of critical shopping activities in response to disasters such as hurricanes, snow storms and epidemics.

Additional measures to automatically activate a response to help the retailer avoid a potential lost sale are not supported by prior art systems.

The above shortcomings point to a pressing need to automatically facilitate consumer and retailer interaction, and to protect both parties from potential risks.

Prior art systems do not support the ability to automatically share the buying experience in real time on social networks. Customers with deep ties to their networks may want to share details of their experience in the process of making a purchase by inviting their friends to participate in the shopping. Social network members may be able to take advantage of special deals at the store or share their corresponding buying experience on the item at a different store. Social networks serve as unstructured but vital media for evaluating user acceptance of products and services, and they provide a level of authenticity that consumer surveys may lack.

Prior art systems do not allow an individual to engage an automatic system to reserve and prepay for a metered parking space using a competitive bidding process or any other means of checking the availability of parking spaces during peak or off-peak periods.

Where a parking ticket is issued in error for violating a city's parking ordinance or if the driver chooses to contest a ticket, there is no convenient means of automatically disputing the ticket with proof of payment or other mitigating factors available within the system of a mobile commerce services provider (MCSP).

Prior art systems do not allow a consumer to automatically lock-in gas and convenience item prices based on discount offers from multiple gas stations competing for their business within a defined area and time limit. A regular customer to a gas station with a purchasing pattern is unable to view the full list of special offers available for the items he/she buys regularly or other promotions for which they may be eligible. For example, a customer whose vehicle may be due for an oil change or state inspection may receive special offers from the gas station offering these extra services based on the due dates of these events.

Prior art systems do not support the use of mobile devices for automatically reserving and paying taxi fares and the subsequent accumulation of potential reward points based on patronage of a specific taxi company's service. Transactions are based on credit card and cash payments; as a result, individuals who live in cities where they commute to destinations with a preferred cab service are not able to automatically track their trips with a mobile commerce service provider's system that is equipped with a global positioning system (GPS) and integrated with a mobile device.

Prior art systems do not enable an automated money transfer decision to be related to the purpose for which the transfer is being made. They also prevent the subsequent automatic tracking of post transfer activities. For instance, if the sender and receiver are business associates who want to directly benefit from special offers available from a retailer who serves as a payment agent for the money transfer, such as granting further discounts on purchases at the payment agent's store, prior art systems will not automate the processes needed to support the selection of such an agent.

Prior art systems only allow the use of bank cards or other charge cards for Automated Teller Machine (ATM) transactions. Such transactions are not now automated using mobile phones or tablet computers.

Prior art systems do not allow for automatic consolidation of reward benefits from multiple unrelated businesses as well as real time enrolment in and notification for such benefits that are offered by retailers to customers based on qualifying requirements recognized by the system, whereby such notification occurs while customer is still in the process of shopping at the store.

These and other problems can be solved using an automatic system for organizing event responses using a mobile communication device.

Solution to Problem

The solution to the above named problems is an apparatus and method supported by the use of individual mobile communication devices to manage, organize and automate responses to events by third parties responsible for addressing activities related to the events.

Advantageous Effects of Invention

An automated system, which organizes and integrates mobile communication devices to event responses, addresses an expandable battery of services responsive to the consumer and government agencies. The automated system is an organizing medium for provision of a diverse selection of services. For example, it can facilitate key aspects of a consumer's buying experience at a store, satisfy subsequent after-sale quality, facilitate safety and customer service requirements, address retailers' pricing and audit protocols; enable reservation and payment for metered parking, taxi cab services, gas station products, vending machine products, Laundromat and hotel transactions; facilitate paperless money transfer among individuals, groups and partnerships that consider specific pay out locations with beneficial product/service offerings; and enable the use of mobile devices for ATM transactions.

In an implementation of the automated system, it can organize the delivery of commercial offers displayed on the consumer's mobile device after such a device has been activated by another mobile device attached to a gas dispenser; while the mobile device assembled in the gas dispenser further recognizes the customer's pattern of purchases and/or eligibility for special offers. Additionally, it can check for availability of items/services and instantly transmits results to the customer's mobile device.

The automated system could aid the overall shopping experience, including ability to seamlessly interact with multiple parties during the shopping encounter, self return/exchange products, enable dynamic pricing practices, safeguard retailer's inventory through audit defense mechanisms, and receive notification in the event of a recall due to safety/quality concerns or a general enhancement of the relationship between customer and retailer.

With the automated system, purchases made can be recorded in an inventory management system, while the sale or transfer of inventory is monitored and any gain or loss from the purchase may subsequently reported to trading partners according to guidelines defined by the parties in the accounting for transactions related to money transfer activities.

With the automated system, customers with multiple bank accounts carrying different ATM cards will find the convenience of using their mobile device to inquire about account balances, receive money transfers, deposit or withdraw money at the ATM machine with a mobile system that interfaces with a mobile device assembled on the ATM machine and is integrated with the bank's ATM network. Concerns about security could be overcome with advanced encryption of consumer data and the development of multi layers of security parameters beyond the PIN code currently required for bank card access to ATMs.

With the automated system, if a retailer is awarding special reward points to recent college graduates for shopping at the store within a given period, the proposed system could notify customers while shopping, because the automated system is an organizing means to collect such information from the customer. The automated system also enables inquiry to the customer, who instantly receives a snap survey on their mobile phone or tablet computer screen requesting the response to such a retailer's question.

With the automated system, consumers can eliminate carrying and presenting a diverse quantity of reward cards issued by a retailer in order to accumulate or use reward points. The automated system can consolidate such identification for all retailers that the customer shops with and introduce customer to other retailers whose reward program may fit customer's shopping patterns.

BRIEF DESCRIPTION OF DRAWINGS

The drawings illustrate preferred embodiments of the method of the invention and the reference numbers in the drawings are used consistently throughout. New reference numbers in FIG. 2 are given the 200 series numbers. Similarly, new reference numbers in each succeeding drawing are given a corresponding series number beginning with the figure number.

FIG. 9 is an elaboration of the activity shown in FIG. 8 for a first example showing a matrix for an in-store shopping activity.

FIG. 10 is an elaboration of the activity shown in FIG. 8 for a second example showing a matrix for a critical shopping requirement activity.

FIG. 11 is an elaboration of the activity shown in FIG. 8 for a third example showing a matrix for a product recall activity.

DESCRIPTION OF EMBODIMENTS

In the following description, reference is made to the accompanying drawings, which form a part hereof and which illustrate several embodiments of the present invention. Dashed arrows in the figures indicate optional steps. The drawings and the preferred embodiments of the invention are presented with the understanding that the present invention is susceptible to embodiments in many different forms and, therefore, other embodiments may be utilized and structural, and operational changes may be made, without departing from the scope of the present invention. For example, the steps in the method of the invention may be performed in any order that results in the responding action being taken.

Figure 1:
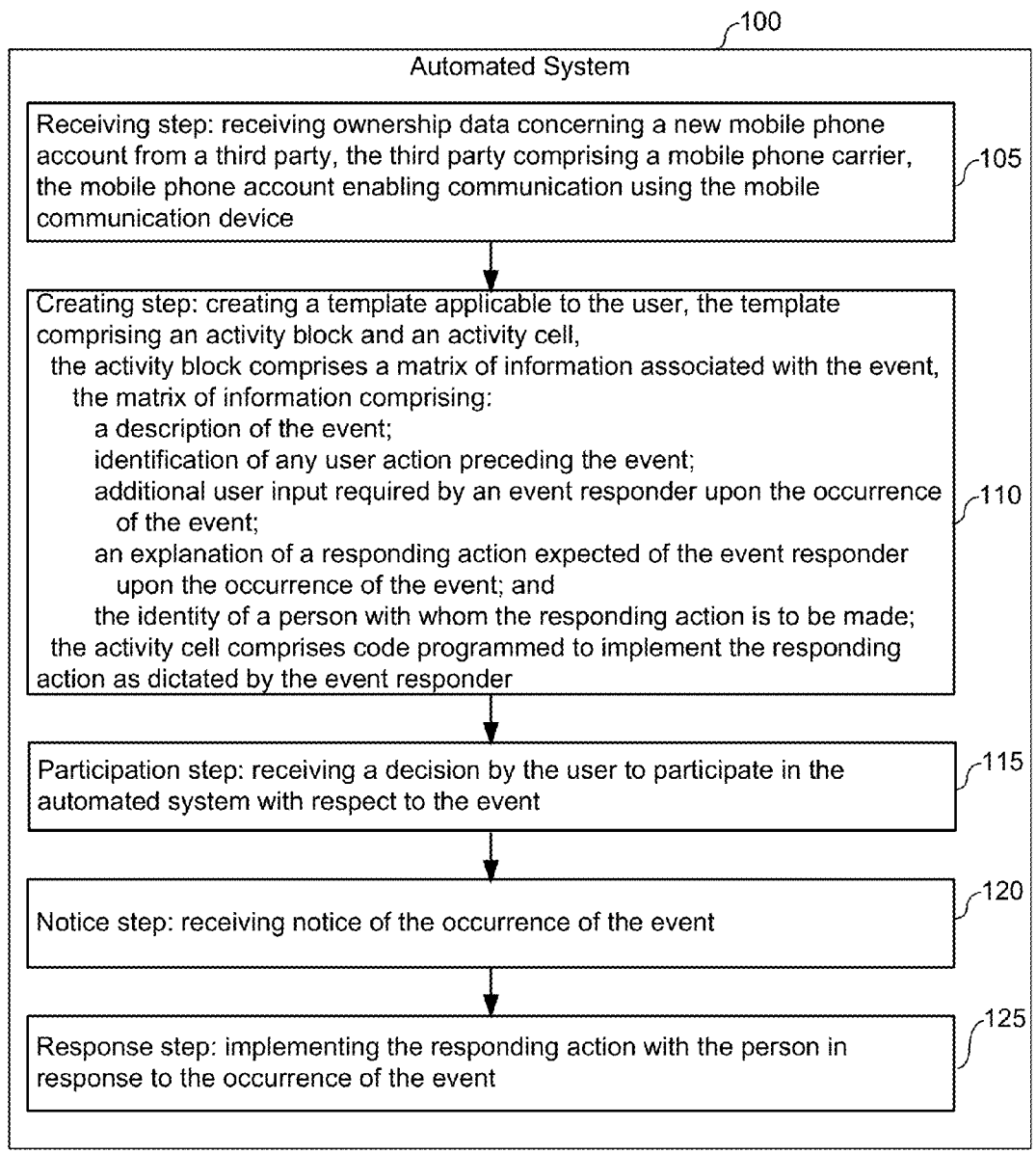
FIG. 1 is a diagram of the method steps implemented by the automated system in a preferred embodiment of the invention.

The invention is an automated system (100) and method shown in FIG. 1 that is supported by the use of individual mobile communication devices to manage, organize and automate responses to events by third parties responsible for addressing activities related to the events. The automated system (100) uses a specially programmed computer with non-transitory computer readable memory, such as RAM, ROM, DVD, CD or a hard drive. The programming controls the automated system (100) and implements the method steps upon activation, such as by any participating user operating the user's cell phone, or by an event responder such as to alert users to take action on an impending disaster.

The automated system (100) enables optimization of a dynamic response to an event. The response is dynamic because it activates physical action on the part of a person, such as a store owner, a salesman, or the user activating the automated system (100) using the mobile communication device. The optimization occurs by connection to the computer implementing the automated system (100) through the mobile communication device operated by the user.

Upon activation, the automated system (100) implements 5 basic steps shown in FIG. 1 and which follow in no required order or sequence: a receiving step (105); a creating step (110); a participation step (115); a notice step (120); and a response step (125).

The receiving step (105) includes receiving ownership data concerning a new mobile phone account provided to the user by a third party, the third party comprising a mobile phone carrier, the mobile phone account enabling communication using the mobile communication device. This ownership data may be provided by the user, by mobile phone carrier, or by any interested person having such data. Since the automated system (100) is implemented using a mobile communication device, there would typically be a provider of communication services associated with the mobile communication device.

The creating step (110) includes creating a template applicable to the user. The template sets up the structure defining who and what is involved in the automatic and dynamic response. The template structure includes an activity block and an activity cell.

The activity block (810) includes a matrix of information associated with the event and this matrix may include any relevant information on the user or the event. In particular, the matrix of information should include a description of the event; identification of any user action preceding the event; additional user input required by an event responder upon the occurrence of the event; an explanation of a responding action expected of the event responder upon the occurrence of the event; and the identity of a person with whom the responding action is to be made. The identity of the person with whom the responding action is to be made may be to the user or it may be to a third party, such as a store owner or salesman needed to directly address a sales issue experienced by the user. If the event involves an accident or natural occurrence, the response may be to a government official who will take the appropriate action.

The activity cell includes code programmed to implement the responding action as dictated by the event responder. The activity cell contains the code causing the actions taken in implementing the automated response or responses to an event. There will preferably be a plurality of activity cells (840).

The participation step (115) includes receiving a decision by the user to participate in the automated system with respect to the event. The automated system (100) is voluntary and implemented when a user decides to participate, either directly or through a third person, such as the mobile phone carrier.

Figure 2:
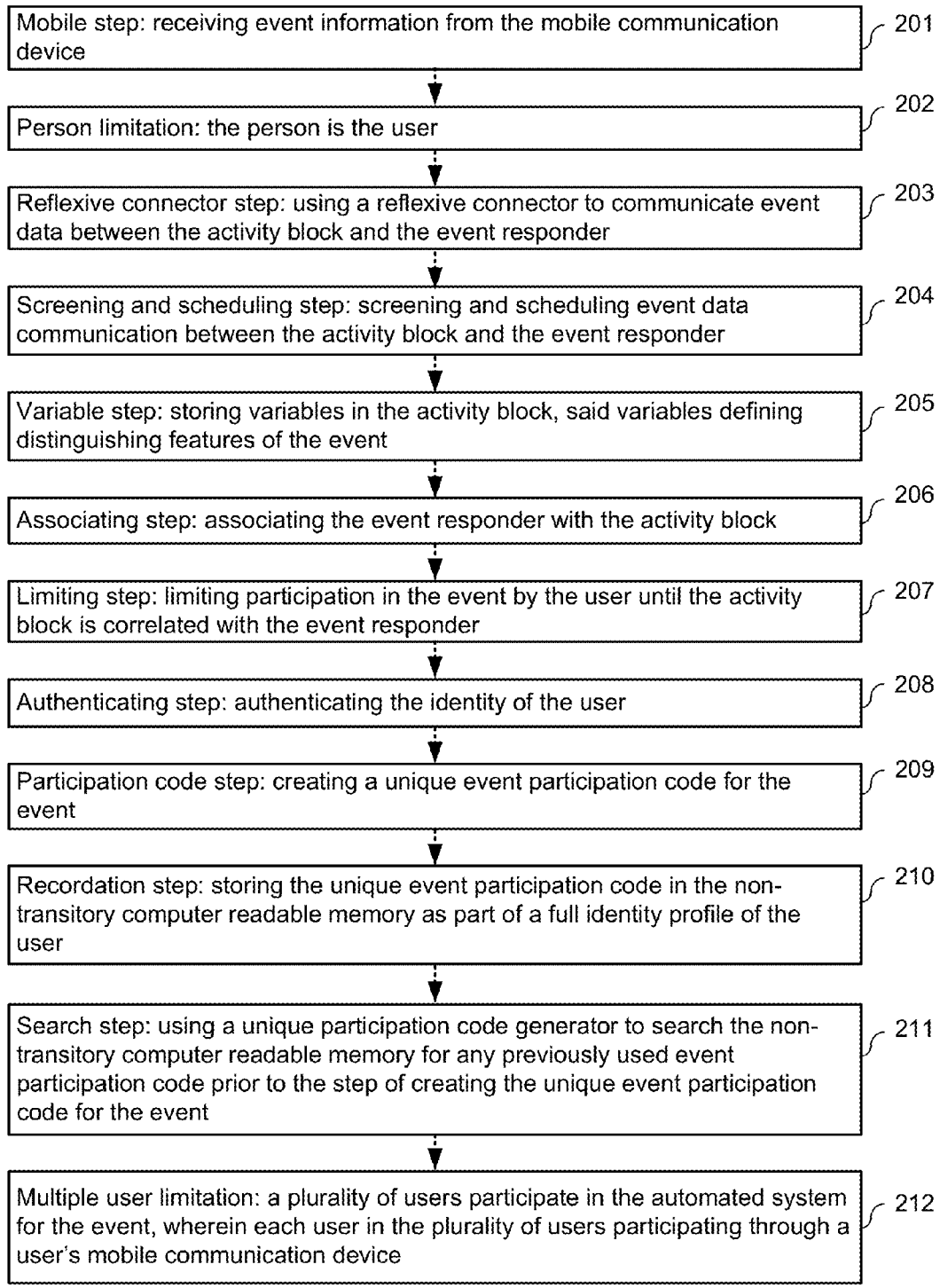
FIG. 2 is a diagram of optional steps and limitations in alternative methods.

The notice step (120) involves receiving notice of the occurrence of the event. This notice may be sent by the user experiencing the event and requesting assistance, or by an event responder, who has information needed by the user. Thus, FIG. 2 illustrates an optional mobile step (201) of receiving event information from the mobile communication device.

The response step (125) includes implementing the responding action with the person in response to the occurrence of the event. As indicated above, the person may be the user or a third party expected to take further action. Thus, there is optionally a person limitation (202) requiring that the person is the user.

The response step (125) may include any other related activity such as guiding, tracking and reporting on the responding action with the person in response to the occurrence of the event.

The automated system (100) may include a screening and scheduling step (204) involving screening and scheduling event data communication between the activity block and the event responder.

The automated system (100) may include a variable step (205) involving storing variables in the activity block, said variables defining distinguishing features of the event.

The automated system (100) may include an associating step (206) involving associating the event responder with the activity block.

The automated system (100) may include a limiting step (207) involving limiting participation in the event by the user until the activity block is correlated with the event responder.

The automated system (100) may include an authenticating step (208) involving authenticating the identity of the user.

The automated system (100) may include a participation code step (209) involving creating a unique event participation code for the event.

The automated system (100) may include a participation code step (210) including storing the unique event participation code in the non-transitory computer readable memory as part of a full identity profile of the user.

The automated system (100) may include a search step (211) including using a unique participation code generator to search the non-transitory computer readable memory for any previously used event participation code prior to the step of creating the unique event participation code for the event.

The automated system (100) may include a multiple user limitation (212) wherein a plurality of users participate in the automated system for the event, and each user in the plurality of users participating through a user's mobile communication device.

Figure 3:
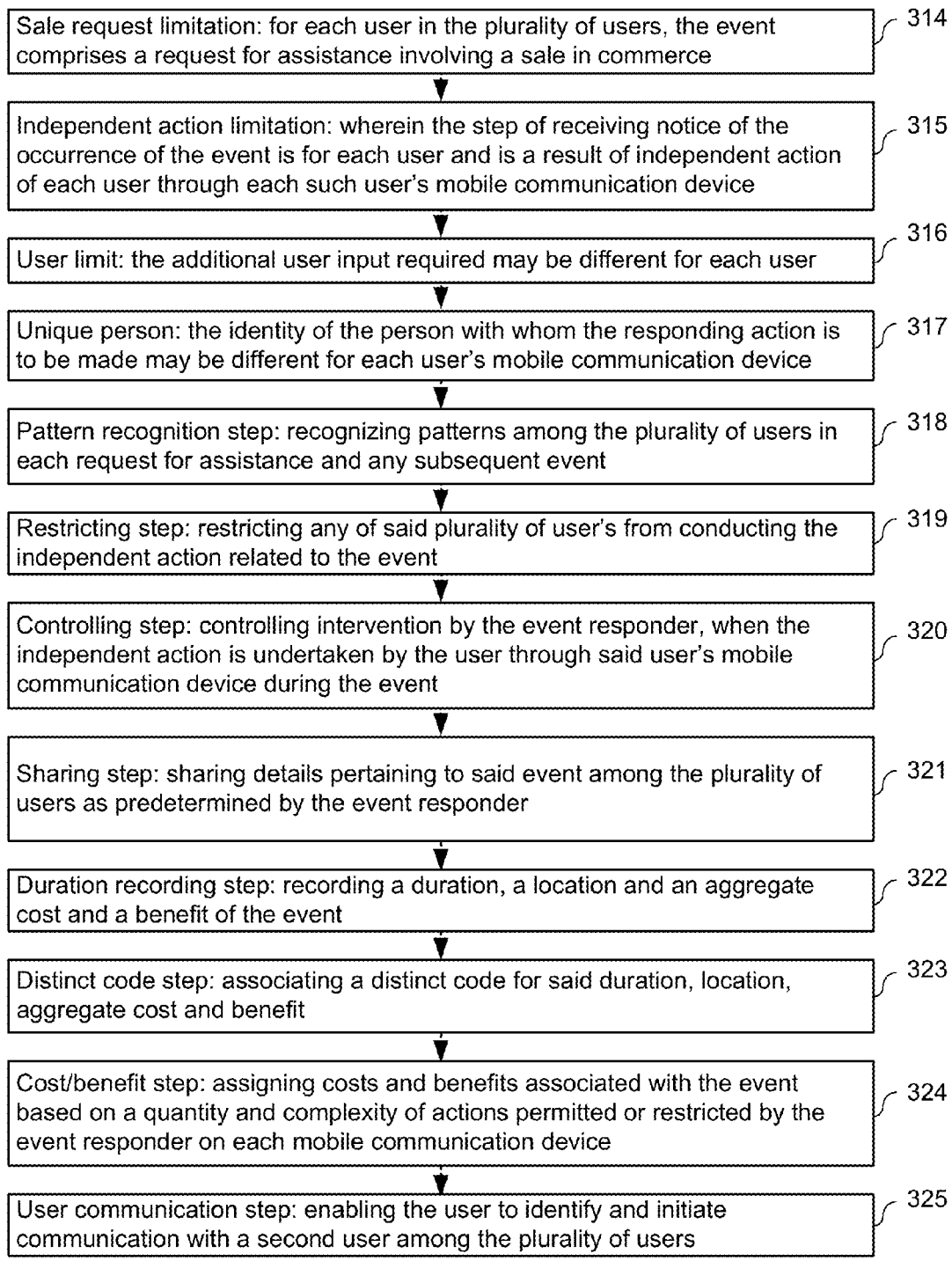
FIG. 3 is a diagram of optional steps and limitations in alternative methods.

For the automated system (100) with the multiple user limitation (212) there may be a sale request limitation (314) as shown in FIG. 3. The sale request limitation (314) specifies that for each user in the plurality of users, the event comprises a request for assistance involving a sale in commerce.

For the automated system (100) with the multiple user limitation (212) there may be an independent action limitation (315) wherein the notice step (120) step of receiving notice of the occurrence of the event for each user is a result of independent action of each user through each such user's mobile communication device.

Figure 4:
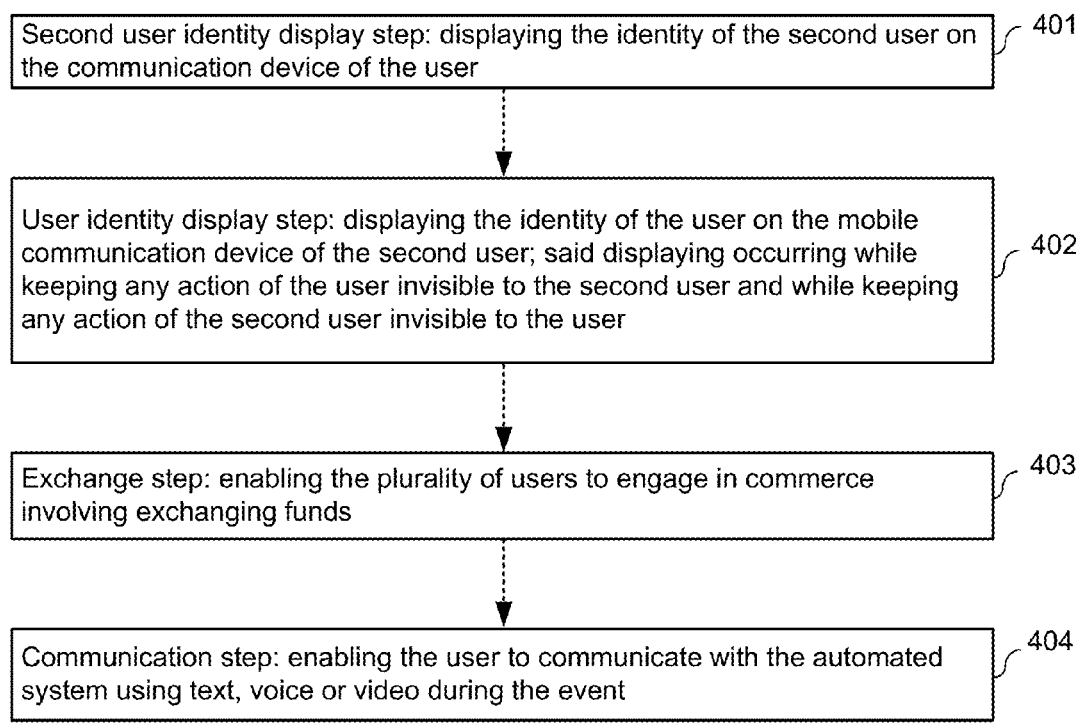
FIG. 4 is a diagram of optional steps and limitations in alternative methods.

For the automated system (100) with the multiple user limitation (212) there may be limitations involving: a user limit (316) where the additional user input required may be different for each user; a unique person (317) limitation where the identity of the person with whom the responding action is to be made may be different for each user's mobile communication device; a pattern recognition step (318) where the non-transitory computer readable memory is further programmed to implement a step of recognizing patterns among the plurality of users in each request for assistance and any subsequent event; a restricting step (319) involving restricting any of said plurality of user's from conducting the independent action related to the event; a controlling step (320) involving controlling intervention by the event responder, when the independent action is undertaken by the user through said user's mobile communication device during the event; a sharing step (321) involving sharing details pertaining to said event among the plurality of users as predetermined by the event responder; a duration recording step (322) involving recording a duration, a location and an aggregate cost and a benefit of the event; a distinct code step (323) involving associating a distinct code for said duration, location, aggregate cost and benefit; a cost/benefit step (324) involving assigning costs and benefits associated with the event based on a quantity and complexity of actions permitted or restricted by the event responder on each mobile communication device; a user communication step (325) enabling the user to identify and initiate communication with a second user among the plurality of users; a second user identity display step (401) in FIG. 4 involving displaying the identity of the second user on the communication device of the user; a user identity display step (402) involving displaying the identity of the user on the mobile communication device of the second user; said displaying occurring while keeping any action of the user invisible to the second user and while keeping any action of the second user invisible to the user; an exchange step (403) involving enabling the plurality of users to engage in commerce involving exchanging funds; or a communication step (404) involving enabling the user to communicate with the automated system using text, voice or video during the event.

EXAMPLE 1

Figure 8:
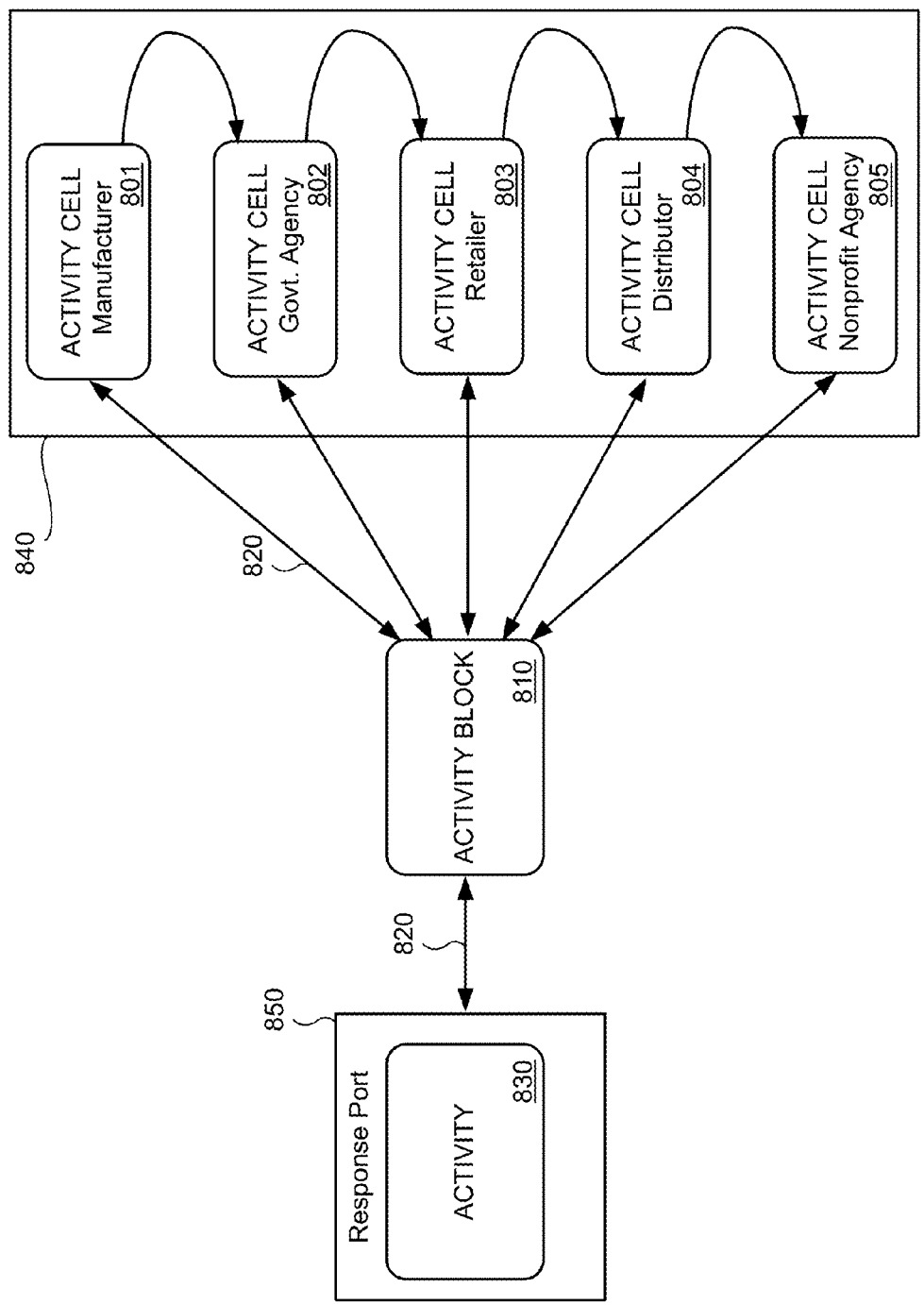
FIG. 8 is an illustration of the structure of a Dynamic Response Optimization Module comprising an activity, an activity block and activity cells.

In this example, the automated system (100) is implemented with a computer module having programmed therein scalable activity blocks/cells integrated through a reflexive connector (820), indicated by the double headed arrows in FIG. 8. A response port (850) manages the response process. The response port plans, organizes, analyzes, directs, executes and communicates responses to critical activities identified through its block and routed by the reflexive connector.

The reflexive connector (820) is a program that routes data between the individual activity blocks/cells and the Response Port (850). The response port (850) is responsible for planning, analyzing and managing the response process for those activities that have been identified by their owners as requiring the most effective response. The response port (850) uses such criteria as owner defined variables, probability theory and other historical indicators to reach decision points.

The reflexive connector (820) is a client program that communicates data between the activity blocks/cells and the response port. The reflexive connector acts as a bridge between the activity blocks and the response port. The reflexive connector (820) communicates based on such factors as: (a) Rules defined by the activity block/cell owner. For example, the Federal Emergency Management Administration (FEMA) may require people seeking emergency assistance to upload their photos or fingerprints in to its block for authentication, a bank may require same for its customers using a mobile phone to withdraw cash at the counter. Additionally, a retailer may permit self checkout using mobile phone to complete a purchase transaction at the store while another retailer may not. And, (b) A response decision point reached by the response port after receiving and analyzing information supplied by the reflexive connector (820), whereby such response is influenced by such factors as (1) magnitude of actionable event (this is owner defined) relative to participants' population; (2) the frequency of such event within a specified period; (3) the estimated duration of actionable event; and (4) probability of reoccurrence. Thus, an embodiment of the automated system (100) includes a reflexive connector step (203) involving using a reflexive connector (820) to communicate event data between the activity block and the event responder In this example, an activity block represents a unique activity database that stores master data controlled by the event responder, also known as the activity owner. The activity block is preferably the highest structure in the master data hierarchy. A cell is a database at a lower level. This may be seen from a parent vs. child relationship perspective; in the sense that a cell rolls up into a block and both levels contain master data of similar characteristics but are distinguished by ownership.

Ownership data may be customer biometric data transmitted by email or uploaded with a device such as a floppy disk or flash drive, whereby such data are read by a program to authenticate identity or complete a set up transaction in the activity block Preferably, an activity facilitator would automatically update the block containing active mobile phone subscribers with such information as their addresses, personal information and mobile phone number(s), etc. This update is reflected at the cell level where the activity block has a cell.

There may be multiple owners of an activity (such as in-store purchasing activity, recall activity, bank account opening activity etc.). Consequently, there will be multiple owners under each individual block and these owners will own their cells in order to control/manage the activity.

In this example, a potential activity that may have one block and one owner may be in such area as airport security (e.g. the Transportation Security Administration (TSA) may need to inform passengers by mobile phone on immediate changes made on what they can bring with them on flights).

In this example, activity blocks/cells are scalable in the sense that an owner may set up a new activity that may not already exist as a block. Additionally, blocks may eventually be structured to take geographical restrictions, such as regional, rather than national dimension, depending on the number of users.

In this example, each activity block is further broken down into cells (based on ownership parameters) and is distinguished by its characteristics, facilitator(s)/owner(s) and participants, etc. The blocks and cells are integrated, via a cloud network (1205) shown in FIG. 12, with the databases and servers of activity owners.

Figure 12:
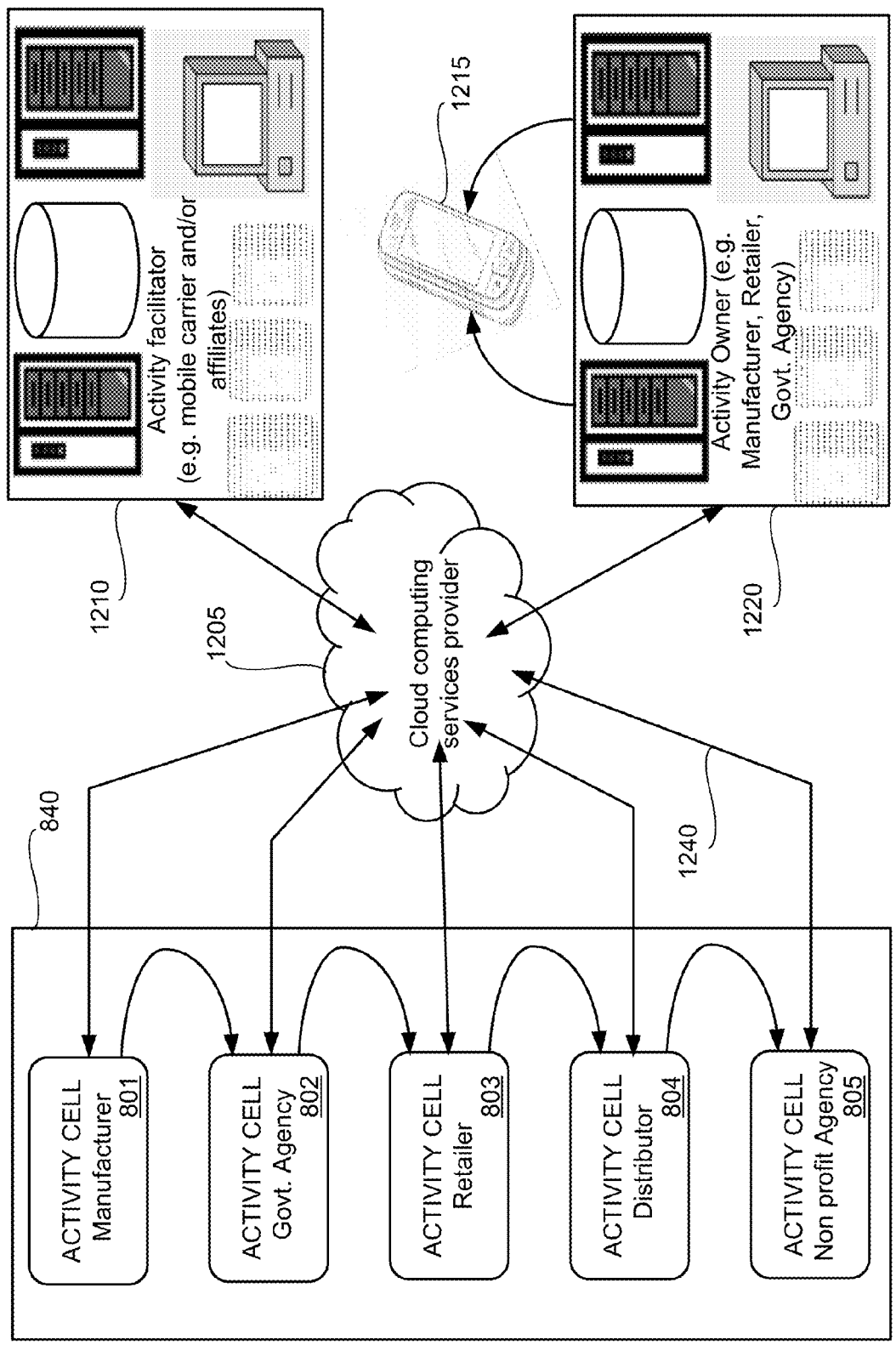
FIG. 12 is a diagram depicting interaction between an activity block with dependent activity cells and reflexive connector with a cloud computer network that is integrated with the databases and servers of third parties involved in diverse activities.

FIG. 12 is a diagram depicting interaction between an activity block with activity cells (840) and reflexive connector, indicated by the double headed arrows (1240) with a cloud computer network (1205). The cloud computer network (1205) serves as a medium for gaining access to the databases and servers of an activity facilitator (1210) and those of an activity owner (1220). Activity owner further communicates with activity participants through their mobile device (1215) using its activity block/cell.

The module enables transactions among the following: a) Activity facilitators (e.g. a mobile telephone company and/or their affiliates, or any other company that maintains data on active mobile phone subscribers). b) Activity owners (e.g. manufacturer, retailer, distributor, governmental agencies, such as FEMA, FDA, USDA, etc.). c) Activity participants (e.g. mobile phone users and/or service organizations that provide such services as medical, legal or equipment maintenance, etc.). A subscriber update program interfaces with the servers and databases of the activity facilitator as well as other client programs that will interact with activity owners and activity participants.

Figure 7:
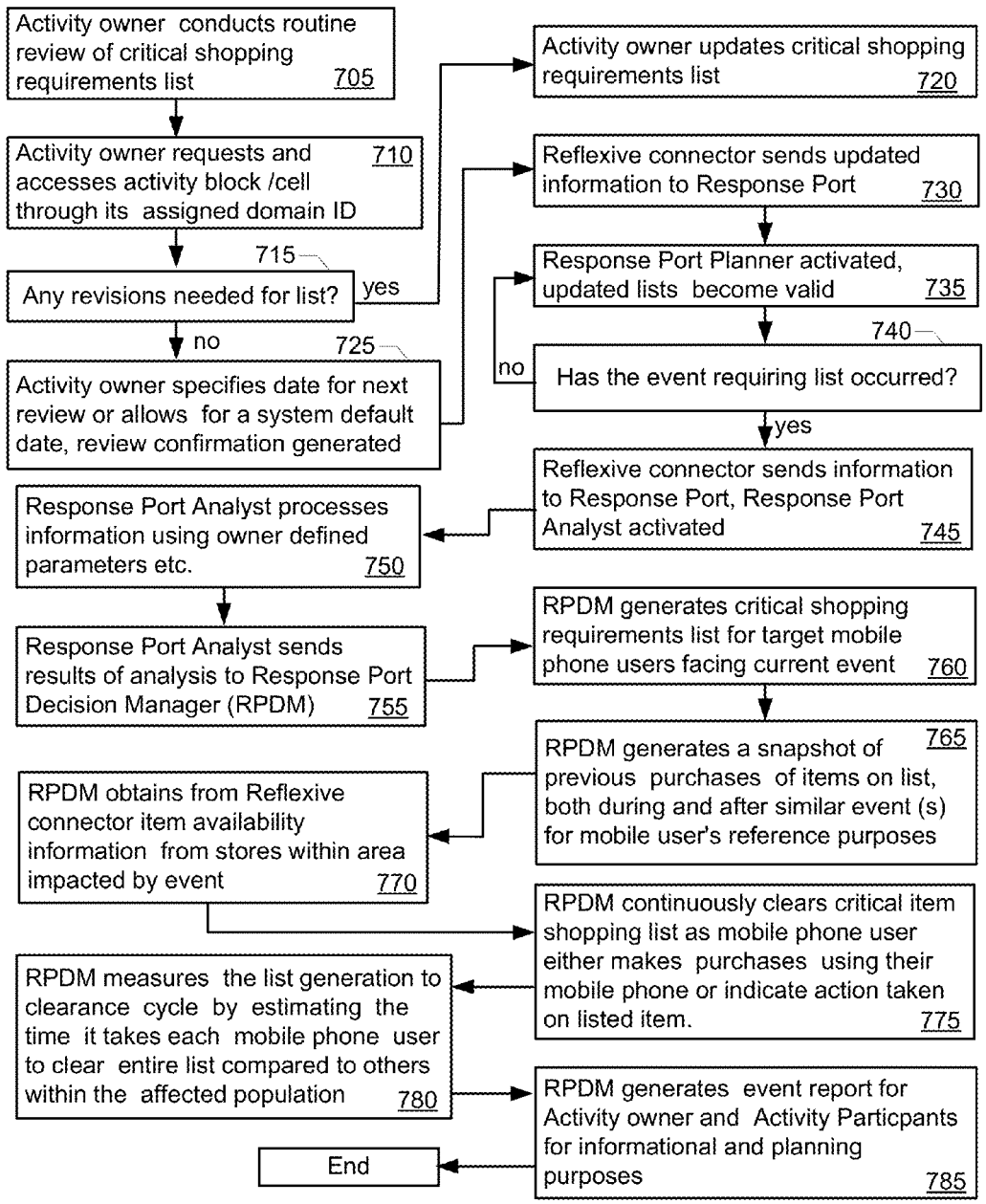
FIG. 7 is a flow diagram illustrating the process of using a Response Port in support of the generation and management of critical shopping requirements list.

FIG. 7 is a flow diagram illustrating the process of using the Response Port (850) in support of the generation and management of critical shopping requirements list. An activity owner may decide to review its activity block/cell to ensure that its critical shopping requirements list is up to date and effective, as shown in step (705).

A request to access the activity block/cell is made and granted in step (710). Step (715) will help determine the need for any revisions to the list. If no revision is required, activity owner may specify the next date for a routine review as shown in step (725), while a revision may be conducted in step (720).

In step (730), the reflexive connector (820) forwards the updated information to the response port and a response port planner is activated in step (735). The response port planner serves as a component ensuring that response to events are anticipated and well thought out. It may also be used as a sandbox for simulating scenarios involving different combinations of critical shopping requirements lists that may be generated during certain events.

In step (740), a determination is made to confirm whether the event being planned for has occurred. If event has occurred, the reflexive connector (820) will communicate the occurrence to the response port (850), as shown in step (745), a response port analyst is activated. The response port analyst is a program responsible for analyzing and processing event occurrence and placing them into categories warranting response or no response by the decision manager as shown by step (750). It uses owner-defined criteria, statistical methods and historical trends to conduct the analyses. Results of analysis of event occurrence are sent to a response port decision manager (RPDM).

In step (755), the RPDM generates critical shopping requirements list for current event in step (760), while a snapshot of similar items purchased in the recent past with a mobile device is generated, shown in step (765).

In step (770), critical inventory information for nearby retailers is sent to the RPDM by the reflexive connector after a search is conducted on their servers and databases via a cloud computer network. The RPDM clears the shopping list as mobile phone user purchases such items or indicates that necessary action has been taken on list, as shown in step (775).

The RPDM measures the responsiveness of mobile phone users by comparing the time taken to clear list with actual purchases made using a mobile device or by indicating that action has been taken on items, as shown in step (780). In step (785), both mobile phone user and activity owner receive system generated event report that will support future planning.

EXAMPLE 2

In this example, the automated system (100) is implemented using a dynamic response optimization (DRO) module to facilitate transactions among interconnected mobile devices linked through a cloud computer network. The DRO module is configured to apply different activity codes/sub codes to identify each transaction type/category; as well as to systematically plan, organize, integrate, direct, execute and communicate responses to activities involving mobile devices owned by such parties as a consumer, retailer, wholesaler, manufacturer and regulatory/governmental agencies etc.

FIG. 8 is an illustration of the structure of the dynamic response optimization module. The activity block is expanded for three examples in FIG. 9, FIG. 10, and FIG. 11. An activity block (830) includes activity cells (840) that reflect the multiple ownership dimension of such an activity. Each activity block is preferably identified by a domain ID. Where activity cells exist under an activity block, such domain ID is extended to separately identify each owner at the activity cell level, for example manufacturer (801), govt. agency (802), retailer (803), distributor (804) and nonprofit agency (805).

In this example, the DRO module generates a critical shopping requirement alert and item listing to the mobile devices of shoppers who reside in areas with potential or current disasters; and further assists in maintaining visibility on purchasing activity during and after such events.

In this example, the DRO module enables a manufacturer or regulatory agency to recall a product by directly targeting the mobile devices of product buyers; additionally, it provides estimates of the short and long term legal, health, safety and financial impact of the recall to all affected parties in joint and/or separate regular notifications and disclosures.

Figure 14:
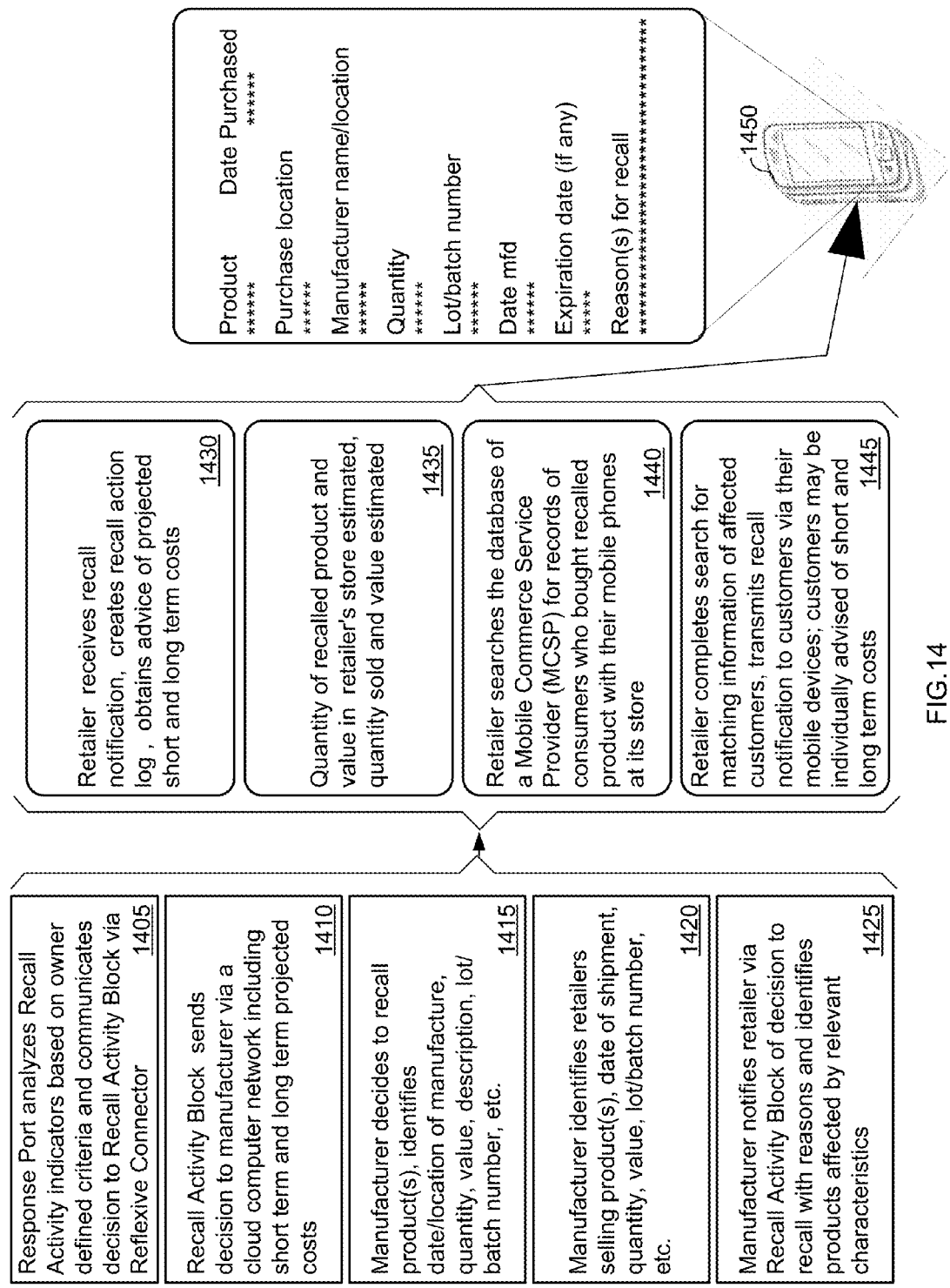
FIG. 14 is an illustration of the path a manufacturer may follow to recall products that have been purchased from retail stores via the use of mobile phone or tablet computer.

FIG. 14 is an illustration of the path a manufacturer may follow to recall products that have been purchased from retail stores via the use of mobile phone or tablet computer. In order to adequately protect consumers, manufacturers and retailers need to develop seamless ways of reaching the population that bought potentially hazardous products within a short period of time.

In step (1405), the response port analyzes key indicators of recall activity based on criteria defined by activity owner. A decision is sent to manufacturer via recall activity block in step (1410), including estimated short term and long term costs; while the manufacturer makes a determination that a product should be recalled in step (1415).

The scope of the recall, the quantity affected and its value may be determined at this stage. In step (1420), the manufacturer identifies the respective retailers who sold the item(s) along with the date(s) products were shipped to retailer as well as retailers' receipt confirmation records available to manufacturer. The manufacturer also notifies retailer(s) on reason(s) for the recall, the batches affected, quantity and value etc. as shown in step (1425).

In step (1430), the retailer receives recall notification along with estimates of short and long term costs. The retailer creates a recall action log with tracking capabilities for the retailers' internal record purposes. The retailer estimates quantity and value of on-hand inventory and quantity and value of sold inventory falling under the recall category, as shown in step (1435).

A selective search on MCSP's database via the cloud computer network for records of consumers who bought the recalled item(s) from the store with their mobile phones is conducted in step (1440). The targeted search is completed in step (1445), followed by the retrieval of details of the consumer transactions related to item, date, quantity and value parameters. The retailer sends a recall notification to the consumer's mobile device in step (1450).

In this example, the DRO module generates notification to the mobile device of a store associate to engage a customer when a customer's shopping activity may result in loss of business.

In this example, a requirement for the physical audit verification of certain items is triggered when certain predefined thresholds are met in the course of shopping activities conducted with mobile devices.

Figure 13:
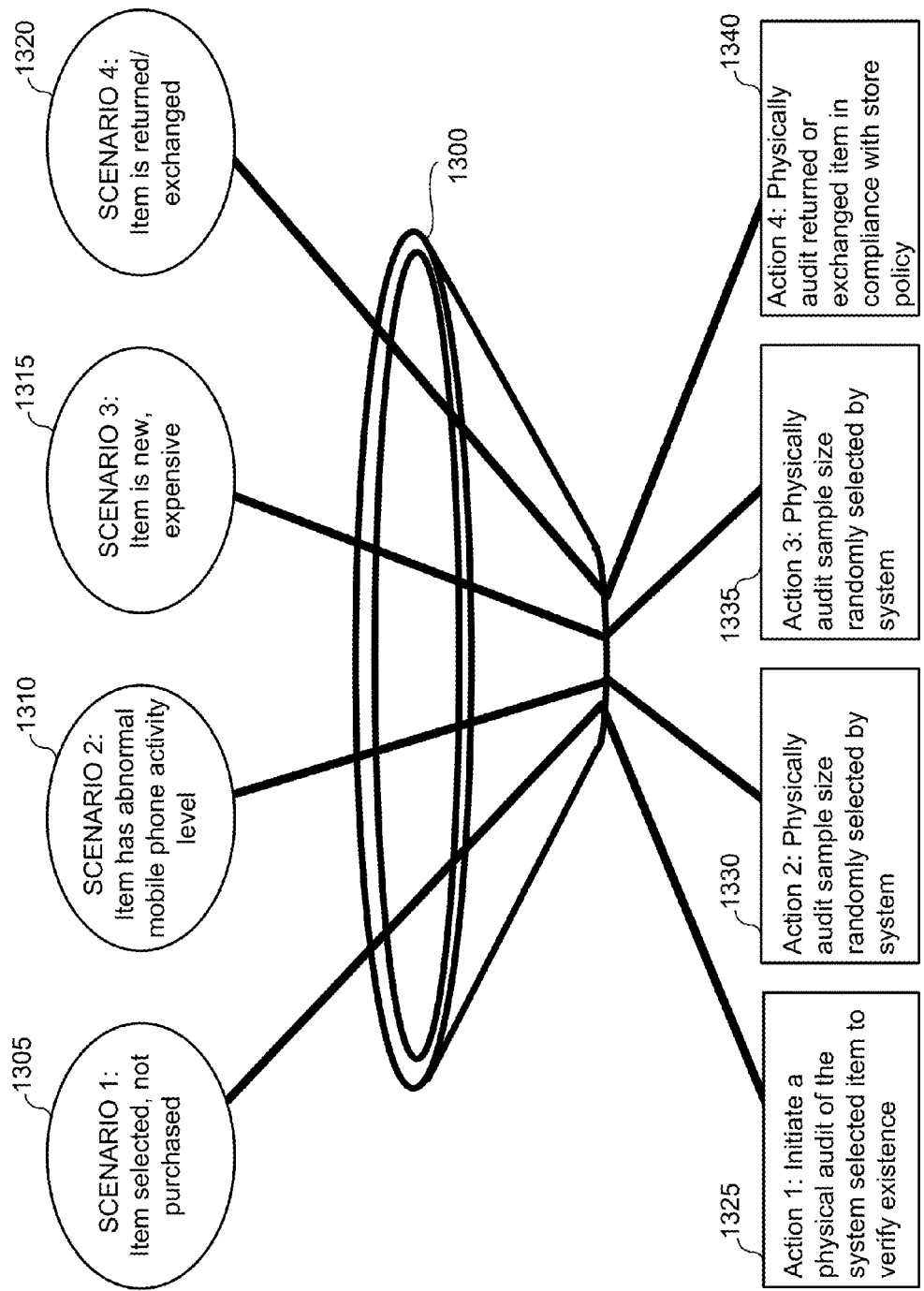
FIG. 13 is an illustration of the potential scenarios that may serve as triggers for the physical audit and verification of inventory that are objects of customer activity at a store based on specifications defined by the activity owner in its block/cell.

FIG. 13 is an illustration of the potential scenarios that may serve as triggers for the physical audit and verification of inventory that are objects of customer activity at the store based on specifications defined by the activity owner in its block/cell. A systematic filtering mechanism (500) enables the recognition of risk factors that may lead to inventory shrinkage; therefore an inventory audit may be requested based on specified levels of inventory transaction frequency, in order to mitigate the risk of loss. For instance if an item is selected with a certain amount of frequency and no system-recorded purchases typically follow, it may be subject to an audit trigger, shown as scenario 1 (1305).

When majority of the activity for an item come from mobile phones or tablet computers, an audit may be triggered at pre-defined levels of frequency, shown as scenario 2 (1310). The latest and expensive products may also trigger audits at pre-defined activity levels, shown as scenario 3 (1315).

Items returned or exchanged may lead to an audit, shown as scenario 4 (1320). Dependent activities intended to support physical verification of inventory that are objects of mobile device shopping activity are shown sequentially as Action 1 (1325), Action 2 (1330), Action 3 (1335) and Action 4 (1340) respectively; and they all reflect the audit responses generated to audit triggers described in scenario 1 (1305), scenario 2 (1310), scenario 3 (1315) and scenario 4 (1320) respectively.

In this example, a customer may request the assistance of a store associate or their social network.

In this example, the DRO module enables funds to be transferred between mobile devices based on the requirement to report and analyze the utilization of funds and return on investment parameters.

Figure 5:
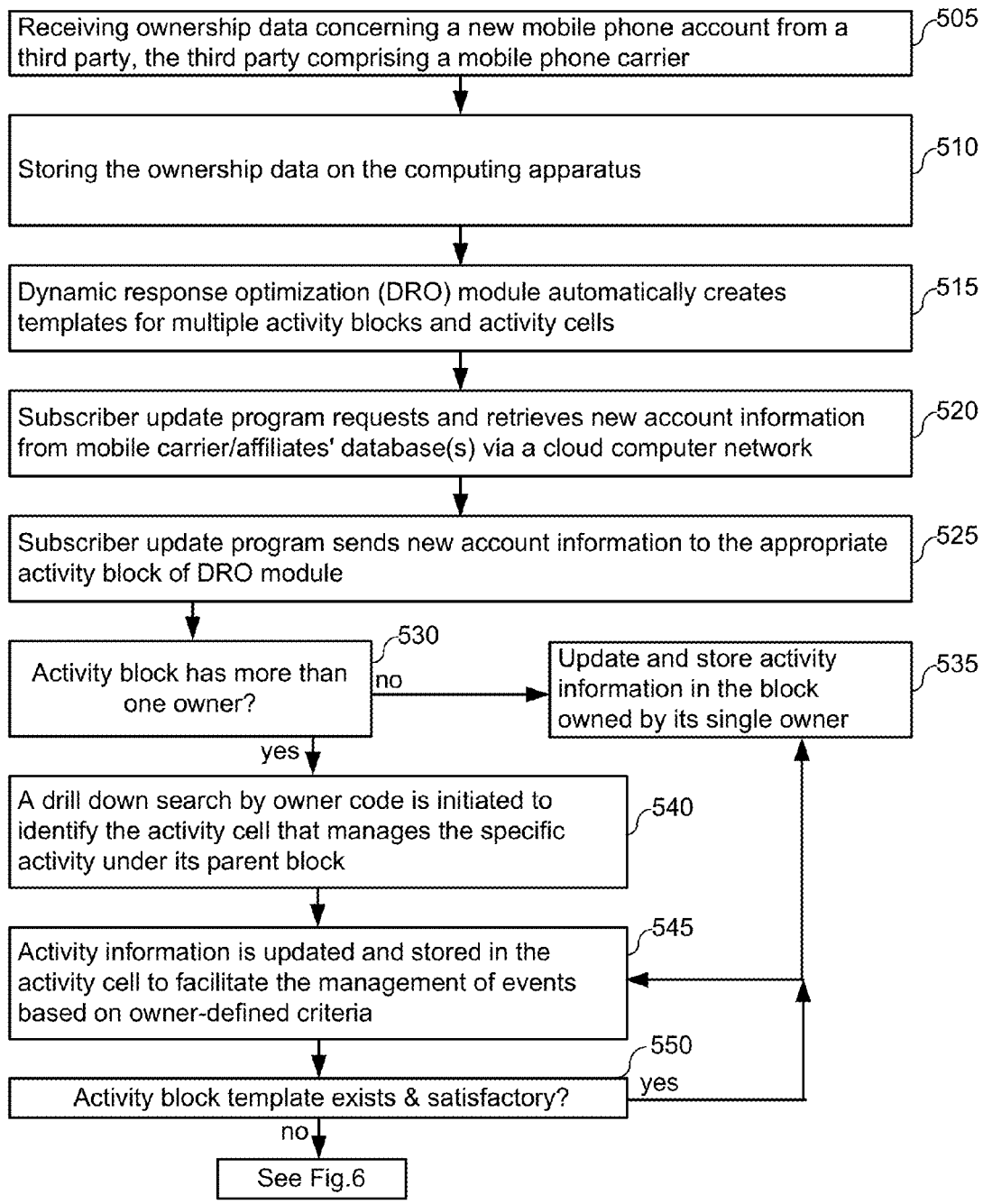
FIG. 5 is a diagram of steps elaborating on the process shown in FIG. 1.
Figure 6:
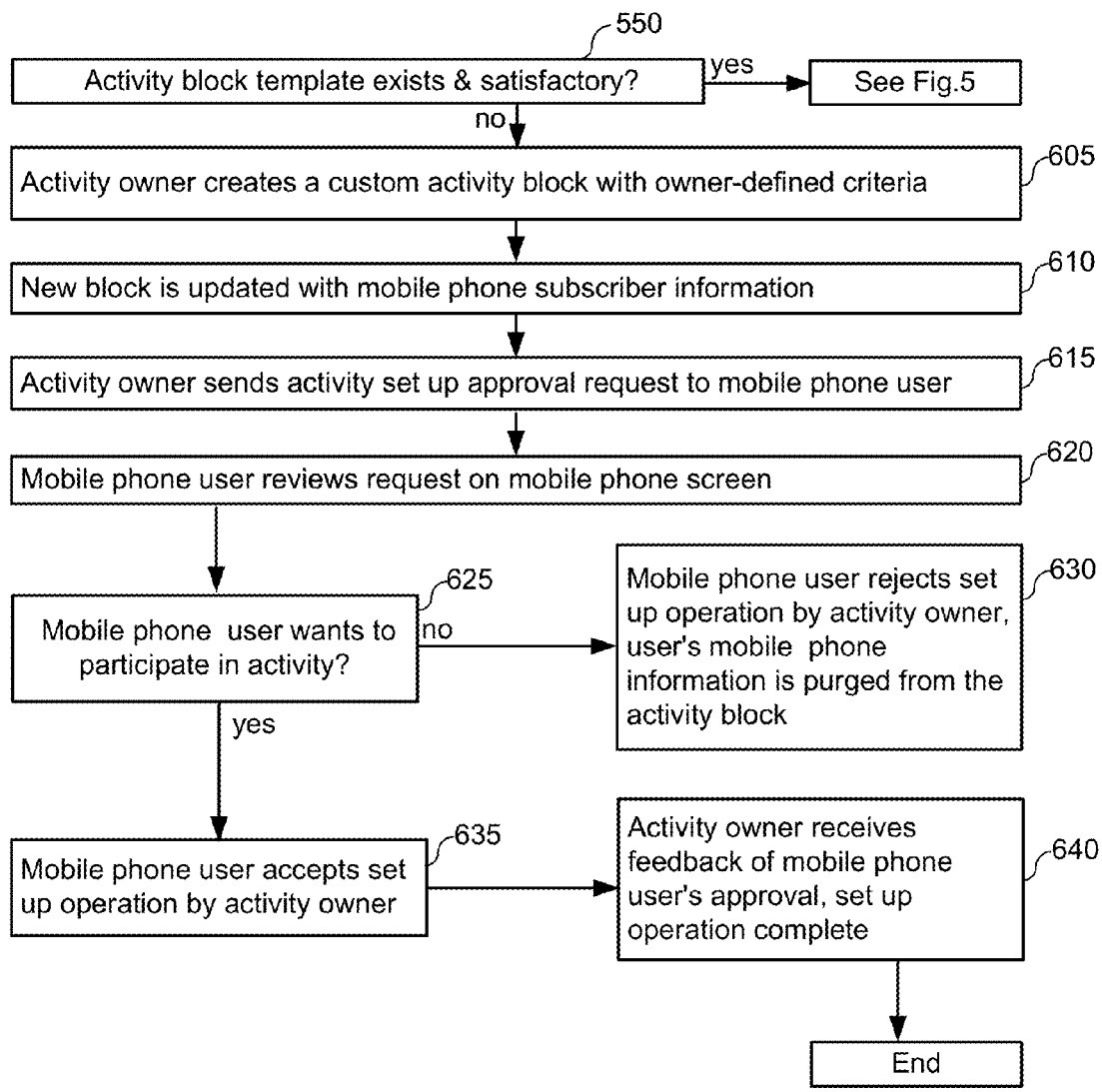
FIG. 6 is a continuation of the diagram from FIG. 5.

FIG. 5 is a flow diagram illustrating the steps involved in setting up activity blocks/cells in the DRO module as well as the activation of mobile users' participation in activities managed from such activity blocks/cells. A mobile phone carrier activates a new mobile phone number and step (505) is receiving ownership data concerning a new mobile phone account from a third party, the third party comprising a mobile phone carrier.

The ownership data includes the new phone number and all relevant customer information such as name and address and step (510) is storing the ownership data on the computing apparatus. These data are preferably stored in a database maintained by the carrier or their affiliates.

Activity block/cell templates are automatically created and this is indicated in step 515, which specifies that a dynamic response optimization (DRO) module automatically creates templates for multiple activity blocks and activity cells. The templates are for use by owners whose requirements are satisfied using the templates.

A subscriber update program preferably retrieves customer information as indicated in step (520), which specifies subscriber update program requests and retrieves new account information from mobile carrier/affiliates' database(s) via a cloud computer network. The subscriber update program sends new account information to the appropriate activity block of DRO module, as shown in step (525).

A determination of whether or not an activity block is managed by more than one owner is made in step (530), which asks if an activity block has more than one owner. This is important because activities related to such areas as retail; banking or manufacturing may have multiple owners, whereby each owner will be assigned an activity cell with identifiable domain boundary; whereas certain regulatory or government-related activities may have one activity owner, therefore no activity cells may exist under such a block.

Updated information is preferably stored in its single owner activity block and step 535 therefore requires the system to update and store activity information in the block owned by its single owner.

A search is conducted to identify the activity cell of the owner using an owner code that matches its domain ID and so step (540), specifies that the system will perform a drill down search by owner code to identify the activity cell that manages the specific activity under its parent block.

The activity owner's information is updated in its activity cell and this is indicated in step (545), in which the system performs a step in which activity information is updated and stored in the activity cell to facilitate the management of events based on owner-defined criteria.

The existence and adequacy of an activity template is verified and this is indicated in step (550) in which the system asks if the activity block template exists and is satisfactory. If not in existence or is unsatisfactory, the activity owner may create a custom activity block to meet its unique requirements, this creates a new domain ID as shown in step (605); additionally, subscribers' mobile phone information that defaulted to a template (if any existed) will be redirected to the newly created activity block, as shown in step (610). An approval request is sent to the mobile phone user in step (615), mobile phone user reviews request in step (620). Mobile phone user determines whether to approve request and participate in owner's activities in step (625). If mobile phone user rejects the request, their information is removed from the activity block as shown in step (630). However, mobile phone user may approve the request in step (635), while the activity owner is notified in step (640).

The above-described embodiments including the drawings are examples of the invention and merely provide illustrations of the invention. Other embodiments will be obvious to those skilled in the art. Thus, the scope of the invention is determined by the appended claims and their legal equivalents rather than by the examples given.

What is claimed is:

1. An automated system enabling optimization of a dynamic response to an event affecting a user of a mobile communication device, said optimization occurring by connection through the mobile communication device operated by the user, the automated system comprising non-transitory computer readable memory programmed to implement steps, the steps comprising:
   receiving ownership data concerning a new mobile phone account provided to the user by a third party, the third party comprising a mobile phone carrier, the mobile phone account enabling communication using the mobile communication device;
   creating a template applicable to the user, the template comprising an activity block and an activity cell for the event, wherein:
      the activity block comprises a matrix of information associated with the event, the matrix of information comprising:
         a description of the event;
         additional user input required by an event responder upon the occurrence of the event;
         an explanation of a responding action expected of the event responder upon the occurrence of the event; and
         an identity of a person with whom the responding action is to be made;
      the activity cell comprises code programmed to implement the responding action as dictated by the event responder;
   receiving a decision by the user to participate in the automated system with respect to the event;
   receiving notice of the occurrence of the event; and
   implementing automatically the responding action with the person in response to the occurrence of the event.

2. The automated system of claim 1, further comprising the step of receiving event information from the mobile communication device.

3. The automated system of claim 1, wherein the person is the user.

4. The automated system of claim 1, further comprising a step of using a reflexive connector to communicate event data between the activity block and the event responder.

5. The automated system of claim 1, further comprising the step of: screening and scheduling event data communication between the activity block and the event responder.

6. The automated system of claim 1, further comprising the step of storing variables in the activity block, said variables defining distinguishing features of the event.

7. The automated system of claim 1, further comprising the steps of associating the event responder with the activity block; and limiting participation in the event by the user until the activity block is correlated with the event responder.

8. The automated system of claim 1, further comprising the steps of: authenticating the identity of the user; and creating a unique event participation code for the event.

9. The automated system of claim 8, further comprising the step of storing the unique event participation code in the non-transitory computer readable memory as part of a full identity profile of the user.

10. The automated system of claim 9, further comprising the step of using a unique participation code generator to search the non-transitory computer readable memory for any previously used event participation code prior to the step of creating the unique event participation code for the event.

11. The automated system of claim 1, wherein:
a plurality of users participate in the automated system for the event, each user in the plurality of users participating through a user's mobile communication device;
for each user in the plurality of users, the event comprises a request for assistance involving a sale in commerce;
the step of receiving notice of the occurrence of the event is for each user and is a result of independent action of each user through each such user's mobile communication device;
the additional user input required may be different for each user;
the identity of the person with whom the responding action is to be made may be different for each user's mobile communication device; and
the non-transitory computer readable memory is further programmed to implement a step of recognizing patterns among the plurality of users in each request for assistance and any subsequent event.

12. The automated system of claim 11, further comprising the step of restricting any of said plurality of user's from conducting the independent action related to the event.

13. The automated system of claim 11, further comprising a step of controlling intervention by the event responder, when the independent action is undertaken by the user through said user's mobile communication device during the event.

14. The automated system of claim 11, further comprising the step of sharing details pertaining to said event among the plurality of users as predetermined by the event responder.

15. The automated system of claim 11, further comprising the steps of: recording a duration, a location and an aggregate cost and a benefit of the event; and associating a distinct code for said duration, location, aggregate cost and benefit.

16. The automated system of claim 15, further comprising the step of assigning costs and benefits associated with the event based on a quantity and complexity of actions permitted or restricted by the event responder on each mobile communication device.

17. The automated system of claim 11, further comprising the step of enabling the user to identify and initiate communication with a second user among the plurality of users.

18. The automated system of claim 17, further comprising the step of displaying the identity of the second user on the communication device of the user; and displaying the identity of the user on the mobile communication device of the second user; said displaying occurring while keeping any action of the user invisible to the second user and while keeping any action of the second user invisible to the user.

19. The automated system of claim 18, further comprising the step of enabling the plurality of users to engage in commerce involving exchanging funds.

20. The automated system of claim 11, further comprising the step of enabling the user to communicate with the automated system using text, voice or video during the event.

\* \* \* \* \*